United States Patent [19]

Hayduchok et al.

[11] Patent Number: 4,681,471
[45] Date of Patent: Jul. 21, 1987

[54] KIT COMPRISING MULTICOLORED FLUID DISPENSER MARKERS TOGETHER WITH ERADICATING FLUID DISPENSER, STAMPS AND STAMP PAD

[75] Inventors: Leon Hayduchok, Trenton, N.J.; Leopold Strauss, Forest Hills, N.Y.

[73] Assignee: All-Mark Corporation, Inc., Trenton, N.J.

[21] Appl. No.: 636,080

[22] Filed: Jul. 31, 1984

Related U.S. Application Data

[63] Continuation-in-part of Ser. No. 519,921, Aug. 3, 1983, abandoned.

[51] Int. Cl.$^4$ ............................................. B43K 27/00
[52] U.S. Cl. ........................................ 401/34; 106/22; 252/105
[58] Field of Search .................. 401/34, 35; 252/105, 252/89.1, 94; 206/214; 523/161; 106/22

[56] References Cited

U.S. PATENT DOCUMENTS

| | | |
|---|---|---|
| 1,338,184 | 4/1920 | Lindquist . |
| 2,393,111 | 1/1946 | Lehman . |
| 2,481,803 | 9/1949 | Weaver . |
| 2,571,620 | 10/1951 | Sala . |
| 2,891,472 | 6/1959 | Holzer . |
| 2,956,038 | 10/1960 | Juelss et al. . |
| 3,058,579 | 10/1962 | Morin et al. . |
| 3,302,566 | 2/1967 | Blanchet . |
| 3,314,634 | 4/1967 | Carter . |
| 3,388,662 | 6/1968 | Ravreby . |
| 3,590,734 | 7/1971 | Carter . |
| 3,829,224 | 8/1974 | Kloosterhouse . |
| 3,887,287 | 6/1975 | Rosh .................................. 401/35 |
| 3,941,488 | 3/1976 | Maxwell . |
| 3,990,304 | 5/1963 | Sulkie . |
| 4,097,289 | 6/1978 | Hofmann et al. . |
| 4,156,657 | 5/1979 | Lin . |
| 4,212,393 | 7/1980 | Lenkoff . |
| 4,367,966 | 1/1983 | Williams et al. . |
| 4,375,191 | 3/1983 | Dickey . |
| 4,413,266 | 11/1983 | Aviram ............................... 252/105 |

FOREIGN PATENT DOCUMENTS

| | | |
|---|---|---|
| 2605939 | 8/1977 | Fed. Rep. of Germany . |
| 1063321 | 3/1967 | United Kingdom . |
| 1076110 | 7/1967 | United Kingdom . |

*Primary Examiner*—Steven A. Bratlie
*Attorney, Agent, or Firm*—Martha G. Pugh

[57] ABSTRACT

A kit which comprises a plurality of multicolor water-based fluid dispensers together with an eradicating fluid dispenser wherein the coloring fluid dispensers may be utilized to create brilliant colored markings; and the eradicating fluid dispenser may be utilized to "erase" the marks from a substrate surface without substantial bleaching or staining of the surface. In a supplement or modification, the multicolored water-based fluids are utilized in individual color stamp pads, together with a stamp pad utilizing the eradicating fluid, which are adapted for use with a series of stamps to make decorative designs.

33 Claims, 9 Drawing Figures

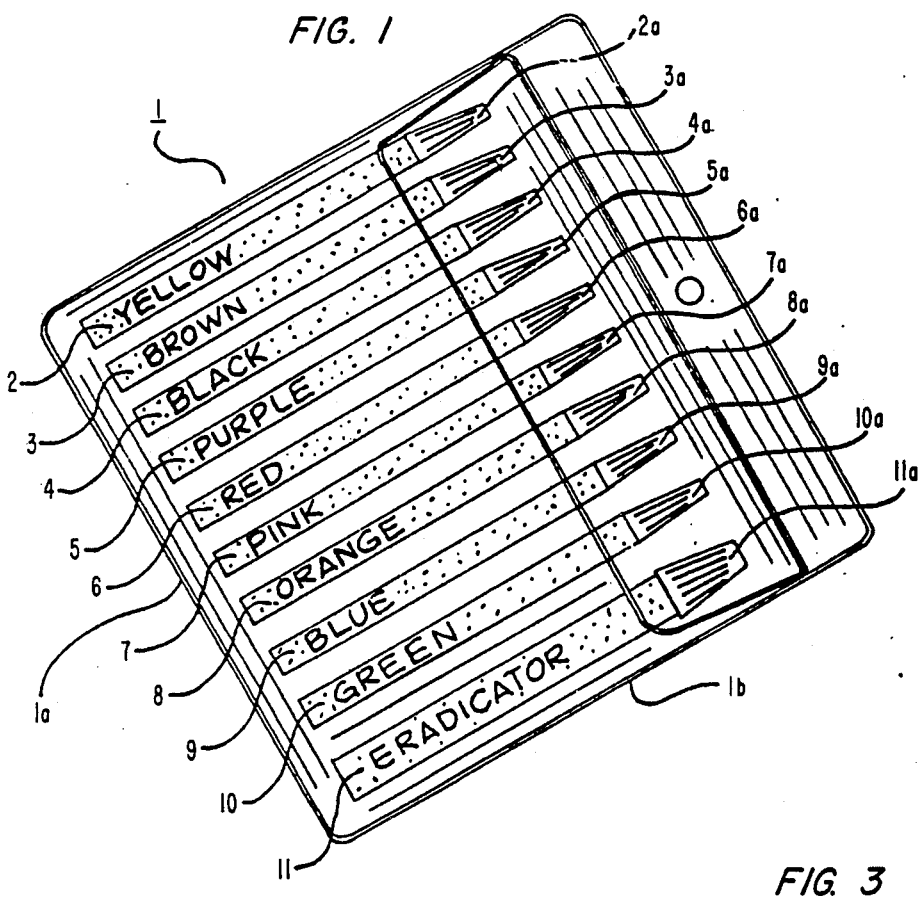
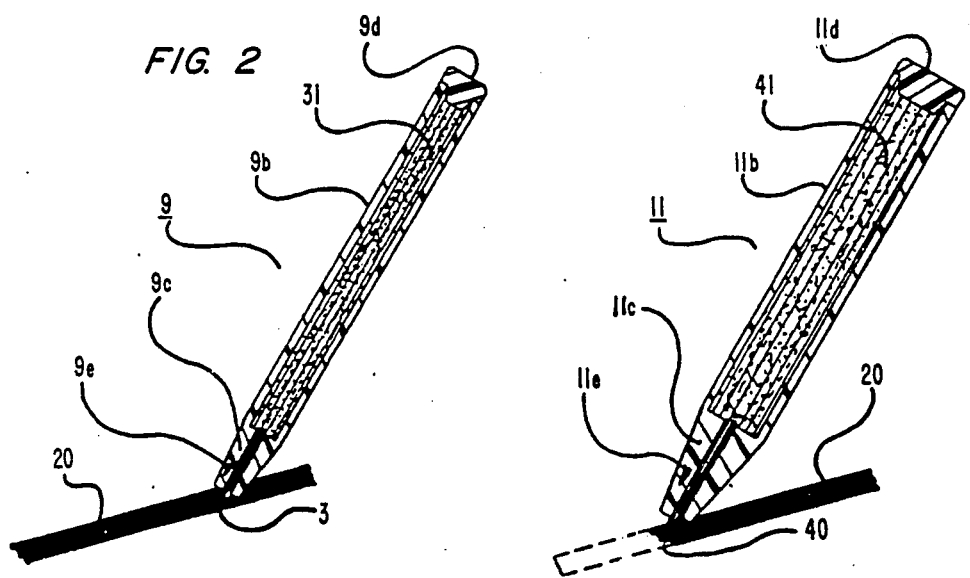

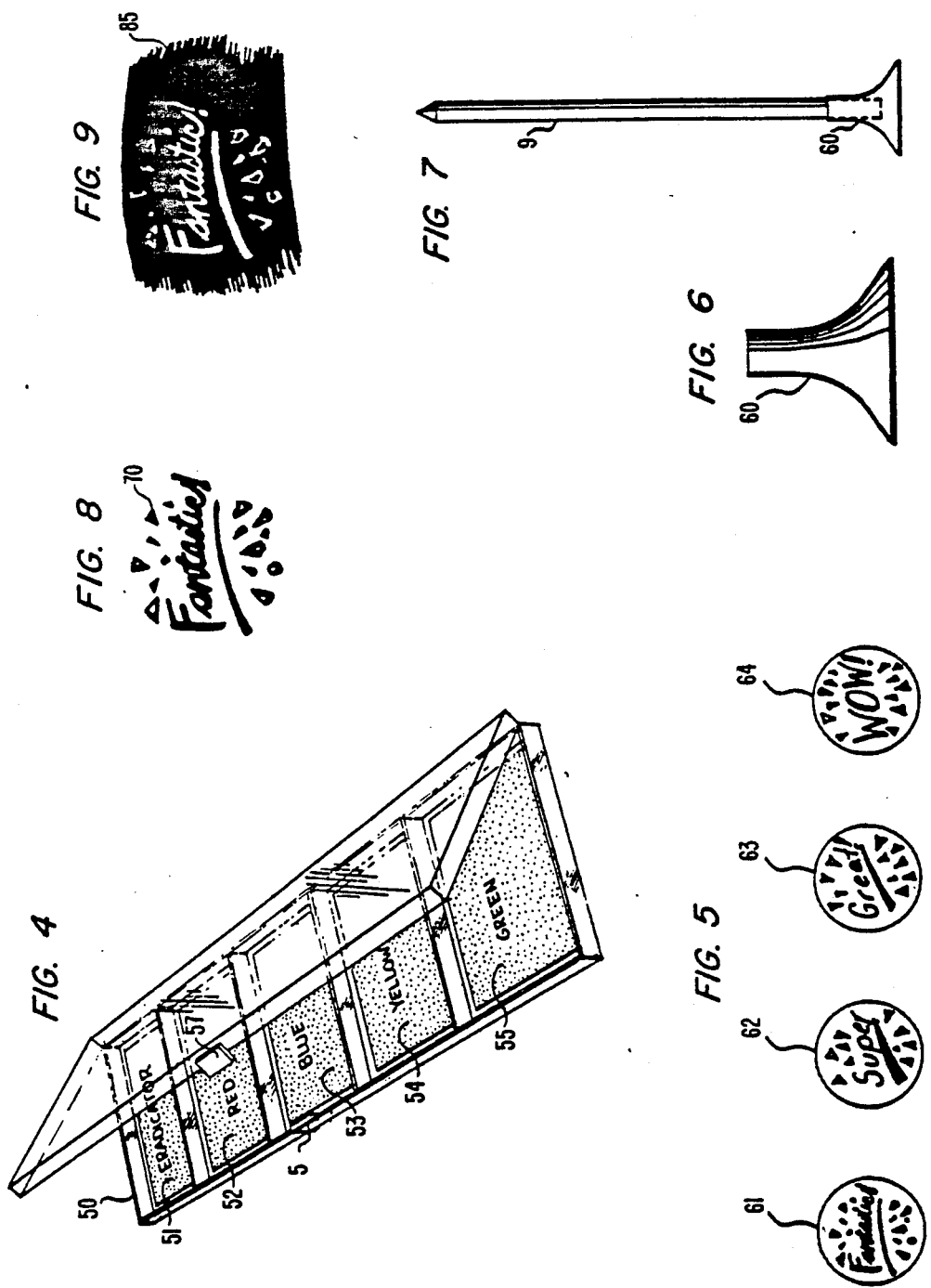

KIT COMPRISING MULTICOLORED FLUID DISPENSER MARKERS TOGETHER WITH ERADICATING FLUID DISPENSER, STAMPS AND STAMP PAD

This application is a continuation-in-part of application Ser. No. 519,921, filed Aug. 3, 1983, now abandoned.

BACKGROUND OF THE INVENTION

This invention relates in general to a kit of colored marking devices in combination with means for eradicating the marks of said devices, stamps, and stamp pads.

It is conventional to sell marking devices in sets for use by artists and children for coloring purposes, which sets comprise a plurality of different colors of the rainbow.

A problem which arises, particularly with children, and even with adults working with colored pens or markers, and stamps used with colored stamp pads, is that the colored markings or stamp imprints tend to be made in areas where they are not intended, such as on surrounding walls or furniture, or even clothing. It then becomes necessary to apply an eradicating agent to clean off the unintended markings. One eradicating agent may operate successfully to remove certain colors, but not others. Furthermore, in applying such an eradicator to remove unintended marks from furniture, clothing or the like, they may leave stains or remove the color from the fabric. Also, many types of mark eradicators and inks are of forms which should not be available to children. It has been found that erasable ball-point ink can be removed with an ordinary eraser while fresh but eventually becomes permanently attached to the writing surface. We have also found that the colors of erasable ball-point ink tend to be subdued.

BRIEF DESCRIPTION OF THE INVENTION

Accordingly, it is the principal object of the present invention to provide a set of colored pens or colored fluid dispensers of brilliant rainbow colors so designed that mismarks in the different colors of the kit can be uniformly removed at any point in time without leaving stains or removing the color from the underlying base material or fabric on which they chance to have been made. Another object is to provide such a set of coloring dispensers and eradicating means which are substantially non-toxic in the context of their use. An additional object of the invention is to provide decorator stamps for use with multicolored stamp pads which provide colored imprints which can easily be removed, or which can make imprints by removing the ink in a colored background.

These and other objects are attained in accordance with the present invention by combining in a kit comprising a plurality of pens or marking dispensers of water-based fluid of rainbow colors, together with a dispenser of a water-based eradicator. In accordance with the present invention, the latter contains an eradicating fluid which is chemically formulated to substantially uniformly neutralize and render substantially colorless the marks made by each of the multicolored dispensers of the kit without leaving stains or removing conventional dyes from the fabric or base material on which the marks have been made.

In a modified form, or, as a supplement to the kit of marking pens, the kit of the present invention may comprise individual color stamp pads of the same type of water-based fluids, together with a stamp pad of water-based eradicator fluid therefor, and a series of decorator stamps for use in connection with the stamp pads.

A particular feature of the present invention is that all of the coloring fluid and the eradicating fluid used in the marking dispensers or stamp pads contained in the kit are substantially non-toxic in the context of their use.

The kit in accordance with the present invention comprises an envelope of a flexible material, such as plastic, fabric, or paper having a large rectangular pocket containing a plurality of rainbow color water-based fluid dispensers or marking devices, and a smaller pocket containing a water-based eradicating fluid dispenser to be used for removing the marks made by the coloring fluid dispensers of the kit. Each of the coloring fluid dispensers and the eradicating fluid dispenser is formed of a rigid material, such as, plastic, or metal, in accordance with well-known practice, and includes a tubular body portion having a reservoir holding the fluid. The tubular body terminates at its lower end in a hollow frustoconical member which encloses a porous projecting applicator nib leading along its axis out from the reservoir.

As a modification or supplement to the kit described in the preceding paragraph, the kit may comprise a shallow container formed of plastic or other rigid material, which is subdivided into a plurality of sections, each containing a thin strip of felt, or other absorbent material, such as open-cell sponge, each of which has been impregnated with one of said water-based fluids of a different color, and one of which absorbent strips has been impregnated with said water-based eradicating fluid. As another part of the kit, one or more decorator stamps is provided, formed of polyvinyl chloride, silicone rubber, or any other smooth-surfaced, resilient non-porous material. The individual stamps are formed with a design sculpted on the flat, circular, bottom surface, and terminating on the upper side of each in a cup-shaped protuberance which is designed to fit over one end of the marking dispensers which will then function as a handle.

The eradicating fluid and each of the coloring fluids adapted to be used in the dispensers or stamp pads of the kit of the present invention comprises a basic stock solution, which will be designated 'Solution A', which is common to both the colored fluids and the eradicator fluids. Solution A comprises a mixture of from 0 to 30 percent by weight of high polarity liquids, such as glycol and polyglycol used as humectants, and from 70 to 100% of deionized water. Ethylene glycol, diethylene glycol, and triethylene glycol are the preferable humectants for purposes of this invention.

A second liquid component common to both the coloring fluid and the eradicating fluid is a surface active wetting agent, such as, for example, the non-ionic wetting agent manufactured by Rohm & Haas Co. under the trademark "TRITON X-100" which is a alkylaryl polyether alcohol.

In addition to Solution A and wetting agent, the coloring fluid substantially comprises, for purposes of this invention, an antioxidant to reduce oxidation and specific dyestuff appropriate for the particular color desired. Citric acid is the preferable antioxidant for these purposes.

The eradicating fluid substantially comprises, for purposes of this invention, in addition to Solution A and the wetting agent, also a reducing agent, preferably for present purposes sodium metabisulfite solution $Na_2S_2O_5$, also known as pyrosulfite.

The procedure for producing the coloring fluids is as follows. The individual dyestuff, which is formulated in a manner to be detailed hereinafter, is dissolved with stirring into a solvent which combines basic stock solution, Solution A, wetting agents, and antioxidant which are heated to a temperature of between 30° and 60° Centigrade. The final dye solution is cooled and then filtered to remove foreign matter which may clog the stylus or nib, to provide a continuous flow of the coloring fluid. The eradicating fluid and each of the multicoloring fluids is sealed into the reservoir cavity of a respective one of the dispensers; and the dispensers are then assembled in a kit for sale or use. This combination has the advantage of providing a set of coloring fluid dispensers and/or color stamp pads which produce easily erasable multicolored marks, which may be readily removed without leaving stains, and without removing the color from the base fabric or material, which would be substantially non-toxic in the context of their use. By applying one of the stamps to the eradicator stamp pad, an imprint can be made on a solid ink-covered surface.

For a better understanding of the invention, reference is made to the attached drawings and the detailed description hereinafter. Other objects and advantages of the invention will become apparent from the following detailed description of the invention which is to be taken in conjunction with the accompanying drawings illustrating preferred embodiments of the invention.

SHORT DESCRIPTION OF THE DRAWINGS

FIG. 1 is an overall showing of a kit in accordance with the present invention including a plurality of coloring fluid dispensers and an eradicating fluid dispenser which operates to eradicate the colored marks from each of the dispensers.

FIG. 2 shows one of the coloring fluid dispensers of the kit of FIG. 1 making a mark.

FIG. 3 shows the eradicating fluid dispenser of the kit of FIG. 1 eradicating the mark put down by the coloring fluid dispenser of FIG. 2.

FIG. 4 is a showing of a composite stamp pad holder in accordance with the present invention which includes a series of stamp pads each impregnated with a water-based fluid of a different color, together with one stamp pad impregnated with a water-based eradicating fluid.

FIG. 5 is a bottom view of a series of decorator stamps, each having a different design sculpted thereon.

FIG. 6 is a side-elevational view of any one of the decorator stamps of FIG. 5.

FIG. 7 shows one of the decorator stamps of FIGS. 5 and 6 mounted on the upper and of one of the marker pens of FIGS. 1 and 2, which thereby serves as a handle.

FIG. 8 illustrates a colored stamp imprint on a light or white background of one of the stamps of FIGS. 5 and 6 after the same has been "inked" by stamping it on one of the colored stamp pads of FIG. 4.

FIG. 9 illustrates an imprint made by one of the stamps of FIGS. 5 and 6 after the same has first been stamped on the eradicator pad of FIG. 4 and subsequently applied to make a reverse imprint on a colored surface.

DETAILED DESCRIPTION OF THE INVENTION

Referring to FIG. 1, there is shown a kit 1 in accordance with the present invention which comprises, for example, a container preferably of transparent flexible plastic such as, for example, polyvinyl chloride, forming a double-layered pocket, say 5½ inches in overall width and 6½ inches long, which is sealed around three of its edges and opens across one of the short edges. The pocket has a wide compartment 1a which is about 4½ inches across, and a narrow compartment 1b which is about 1 inch across. A double head piece of plastic 1c extends 1 inch beyond the open end, and is extended across the width to form at its inner end a flap 1d which extends 2¾ inches in a length direction to form a closure.

A plurality of coloring fluid dispensers 2-10, numbering nine in the present example, reflecting the colors of the rainbow, are interposed in the large compartment 1a; and a single eradicating fluid dispenser 11 is interposed into the narrower pocket 1b.

The housings of dispenser 2-10, each of a conventional form for marking devices, are about 5¾ inches in length and ¼ inch in overall diameter. The eradicating fluid dispenser 11 is 6⅛ inches long and ½ inch in overall diameter.

FIG. 2 shows a typical coloring fluid dispenser 9 making a colored mark 20. The dispenser 9, which is substantially identical, except for its color, to the remaining ones of dispensers 2-10, has a cap 9a as shown in FIG. 1, which, in the present embodiment, is about 1½ inches in axial length, 7/16 inch in overall outer diameter, and 5/16 inch in inner diameter, being adapted to be pressure-fitted in telescoping relation to cover the writing end of the dispenser 9. With the cap 9a removed, as shown in FIG. 2, the dispenser 9 has a hollow cylindrical barrel 9b, having an overall axial length of about 5 inches, and which has an overall cross-sectional width of ⅜ inch along most of its length, terminating at the writing end in a frustoconical tip 9c which extends about ⅝ inch along the axis, forming an angle, in cross-section, of about 30° with the axis of the barrel, so that the end portion has an outer diameter of about ⅛ inch, and an internal bore of about 3/32 inch. The frustoconical tip 9c is preferably perforated 9e to allow pressure equalization between the interior and exterior of the barrel 9b. In the present embodiment, there are three perforations 9e equidistant around the circumference. A nib 30 is formed of a bundle of nylon or polyester fibers which are bonded together to provide longitudinal porosity or capillary action. This bundle is about 1/16 inch in overall diameter, extending about ⅛ inch out in an axial direction from the end of the bore, forming a writing point. The inner end of the nib 30 extends inward along the axis of the barrel a short distance, where it makes contact with the ink reservoir 31. This reservoir is formed, for example, of a filler comprised of cellulose acetate or, preferably, polyester fibers. The filler is surrounded by a tube preferably comprised of a co-extrusion of polyethylene and cellophane. The reservoir may be filled up to 80% of the maximum possible amount of fluid that can be absorbed by the filler of the reservoir. If filled over the 80% limit, the dispenser may leak. The amount of coloring fluid contained in, say, reservoir 31, is preferably between 1 and 1.2 cubic centimeters. The reservoir extends substantially the length of barrel 9b up to the conventional end plug 9d. Thus, the colored fluid in the reservoir 31 is fed by capillary action from the reservoir 31 through the nib 30 in the writing or drawing process.

FIG. 3 shows the eradicating fluid dispenser 11 which is substantially similar to the coloring fluid dispensers 2–10 except that it is larger. In its present embodiment, the cap 11a is about 1⅞ inches in axial length, 10/16 inch in overall outer diameter, and 6/16 inch in inner diameter. The cap 11a, similar to the caps of the coloring fluid dispensers 2a–11a, is adapted to be press-fitted in telescoping relation to cover the nib 40 of the eradicating fluid dispenser 11. With the cap 11a removed, as shown in FIG. 3, the eradicating fluid dispenser 11 has, in its present embodiment, a hollow cylindrical barrel 11b having an overall axial length of about 5½ inches, an overall cross-sectional width of ½ inch along most of its length, terminating at the nib 40 ending in a frustoconical tip 11c which extends about ⅜ inch along the axis, forming an angle, in cross-section, of about 30° with the axis of the bundle, so that the end portion has an outer diameter of about ¼ inch, and an internal bore of 3/16 inch. The frustoconical tip 11c is preferably perforated to allow pressure equalization between the interior and the exterior of the barrel 11b. In the present embodiment, there are three perforations 11e equidistant around the circumference. A nib 40 of dispenser 11, about 3/16 inch in overall diameter and extending about ¼ inch out in an axial direction from the end of the bore, is similar in composition and principle of operation to the coloring fluid dispensers 2–10 except that it dispenses an eradicating fluid instead of coloring fluid. The inner end of the nib 40 extends inward along the axis of the barrel a short distance where it contacts the reservoir 41, which is similar in construction and principle of operation to reservoirs, say 31, of the coloring fluid dispensers 2–10, and extends up to the conventional end plug 11d. In a preferred embodiment of eradicating fluid dispenser 11, the amount of eradicator is preferably about 3.2 cubic centimeters.

In FIG. 3, the eradicating fluid dispenser 11 is depicted erasing the mark 20 which was made by the coloring fluid from dispenser 9.

The reservoir 41 of dispenser 11 and the reservoirs, say 31, of the coloring fluid dispensers, are filled with, respectively, water-based eradicating fluid and water-based coloring fluid, the composition and preparation of which fluids are described with specificity hereinafter.

In supplement or in modification to the color marker and eradicator kit described with reference to FIGS. 1–3, FIGS. 4–9 disclose a composite stamp pad comprising a plurality of stamp pads, each impregnated with water-based fluid of a different color, a stamp pad impregnated with water-based eradicator fluid, and a series of decorator stamps to be used in various combinations with the stamp pads.

FIG. 4 shows a shallow rectangular box formed of transparent or translucent rigid plastic such as, for example, high density polyethylene, or lucite, which in the present illustrative embodiment has an overall length, width and depth, say 5 inches, by 2 inches by ⅜ inches, and wall thickness of 1/16 inch. The matching rectangular top is hinged along one of the long edges of the container, and is constructed with a depending tongue 57 along one long edge which snaps closed against a matching tongue 56 centered on the opposite long edge of the container. The container 50 is subdivided along its length into a plurality of compartments 51, 52, 53, 54 and 55, each, say, just under 1 inch wide which can be any desired number depending on the size of the container 50. In each compartment is a strip of felt or any absorbent material, such as open-celled sponge, say 1/16 inch thick, which may be, for example 1¾ inches across, and $\mu$ inch wide. One of these strips, say, 51, is impregnated with a drop, say 2 cubic centimeters of water-based eradicator fluid, of the same type used in the dispenser shown in FIGS. 1 & 3, which will be described in detail hereinafter. Each of the strips in compartments 52, 53, 54, and 55 is impregnated with, say, 2 cubic centimeters of water-based coloring fluid of a different color, of the types used in the dispensers described with reference to FIGS. 1 and 3, and which will be described in detail hereinafter.

It will be understood that container 50 can have any desired number of compartments, with stamp pads individually impregnated with any desired number or combination of colors.

Also included in this supplement kit, to be used with the stamp pads for making multicolored and multi-shaped designs, is a series of decorator stamps, the sculpted bottoms of which are shown as 61, 62, 63, and 64 in FIG. 5. In the present embodiment, the base of these stamps has a diameter of, say, ¾ inch, although they may be of any size and shape. They are preferably formed of a smooth, resilient non-porous material, such as polyvinyl chloride, or silicone rubber, or other types of suitable elastomer material. The shape of each of these stamps is frustoconical, having centered on its upper surface a cup-shaped protuberance, as shown in FIG. 6, which is just large enough to accommodate the end opposite the nib of one of the markers 2–10. Otherwise, any type of round stick, or solid rod can serve as a handle for one of the stamps 61–64.

Because only a thin film of the water-based fluid adheres to the sculpted face of each of the stamps as it is applied to one of the stamp pads in container 50, after a print is made, as shown in FIG. 8 at 70, the stamp can be used on one after another of the stamp pads, without intermingling of the colors. Furthermore, as shown in FIG. 9, a solid color surface can be made by using one of the marker pens, and a clear or white design imprinted therein by first applying one of the stamps to the eradicator pad. It is apparent that school children and artists can make a multitude of different designs using kits in accordance with the present invention.

The solutions for the water-based coloring fluids and the water-eradicating fluids for use in both the dispenser kit and the stamp pad kit comprise a first solution, which is a composite. The basic solution, designated Solution A, is composed of from 70 to 100% deionized water, and the remaining 0 to 30% of high polarity liquids. The high polarity liquids are used as humectants and, for example, may consist essentially of glycols or polyglycols.

Specifically, the following are examples of glycols which may be used singly or in combination with other high polarity liquids for the purposes of the present invention: ethylene glycol, diethylene glycol, polypropylene glycol, triethylene glycol, and tetraethylene glycol. Ethylene glycol, diethylene glycol and triethylene glycol are the preferable glycols for this purpose. Solution A is one component of the common carrier solution used in both the coloring fluid dispensers 2–10 and in the eradicating fluid dispenser 11.

The second component, for this example, of both the coloring fluid dispensers 2–10 and stamp pads 52–55 and the eradicating fluid dispenser 11 and eradicating stamp pad 51, is a surface-active wetting agent, such as, for example, the non-ionic wetting agent manufactured by Rohm & Haas Co. under the trademark "TRITON X-100", which is a alkylaryl polyether alcohol. The wetting agent is used, for the present example, in concentration of from 0.125 to 0.25% by weight of Solution A, to produce an appropriate coloring fluid. When producing the eradicating fluid, the wetting agent is used, for the present example, in concentration of from 0.125 to 0.25% by weight of eradicating fluid.

An antioxidant is used in combination with Solution A, the wetting agent, and the colored dyestuffs to form the fluid of the coloring fluid dispensers 2-10 to reduce oxidation. Such an antioxidant is a substantially non-toxic, sequestering, water-conditioning and dispersing agent, characterized by the general formula:

$$HOOCCH_2C(OH)(COOH)CH_2COOH \cdot H_2O$$

For example, citric acid may be used as an antioxidant for the purposes of the present invention in concentrations of from 2-7% by weight of Solution A to produce coloring fluid to fill the reservoirs of the coloring fluid dispensers. Sequestering agents, such as citric acid, are frequently employed in antioxidant mixtures to nullify the harmful effects of traces of metallic impurities in this context.

Selected dyestuffs are used to produce the brilliant plurality of coloring fluid dispensers 2-10. The dyestuffs may be used singly as per example, yellow or orange, or in combination, as per example, brown, black, red or green. The dyestuffs are here used in concentrations of from 0.125% to 3.25% by weight of the coloring fluid used to fill the reservoir, say 31, of FIG. 2, of one of the coloring fluid dispensers 2-10, or alternatively, eradicator stamp pad 51. Following is a list of examples of specific dyestuffs which may be used for these purposes. The dyestuffs are indicated, where available, by Color Index Number (C.I.#) and color. The Color Index is a system established by the American Association of Textile Chemists and Colorists, P.O. Box 12215, Research Triangle Park, N.C., to allow a manufacturer to describe a color without necessarily disclosing a proprietary chemical formula. Following is a list of the basic dyes from Color Index, 3d Edition, Volume 1 (1971), which essentially constitute the specific dyestuffs which may be used in manufacturing the coloring fluid for the purposes of the present invention:

TABLE I

| Color Index # | Color Index Color | Chemical Class |
|---|---|---|
| 42025 | Basic Blue 1 | Triarylmethane |
|  | Basic Blue 1A | Triarylmethane |
| 42140 | Basic Blue 5 | Triarylmethane |
| 42535 | Basic Violet 1 | Triarylmethane |
| 42555 | Basic Violet 3 | Triphenylmethane |
| 42650 | Acid Violet 17 | Triphenylmethane |
| 42685 | Acid Violet 19 | Triphenylmethane |
| 42640 | Acid Violet 49 | Triphenylmethane |
| 42085 | Acid Green 3 | Triphenylmethane |
| 42100 | Acid Green 9 | Triphenylmethane |
|  | Basic Red 14 | Cyanine |
|  | Basic Red 15 | Methine |
|  | Basic Red 16 | Triarylmethane |
| 48035 | Basic Orange 21 | Methine |
|  | Basic Yellow 49 | Methine |

Basic Yellow 49 does not have a Color Index Number but comes from the family of methines and polymethines which have a Color Index Number of from 48000 to 48999.

The basic colors listed above may be used singly or in combination to form the dyestuffs used in the coloring fluids. Some examples of the dyestuffs, for use in the present invention, are listed in the following table, together with the weight percent of coloring fluid which may comprise, for example, each of the coloring fluids:

| Formula Color | Components (Weight %) |
|---|---|
| Blue | Basic Blue 1A (0.5%) |
|  | Basic Violet 3 (0.375%) |
| Light Blue | Basic Blue 1 (0.25%) |
| Violet | Acid Violet 49 (0.375%) |
| Aqua | Acid Green 3 (2.5%) |
| Green | Basic Yellow 49 (1.5%) |
|  | Basic Blue 1 (1.0%) |
| Light Green | Basic Blue 1 (0.5%) |
|  | Basic Yellow 49 (0.75%) |
| Red | Basic Red 14 (1.5%) |
|  | Basic Yellow 49 (0.67%) |
| Pink | Basic Red 14 (0.57%) |
| Magenta | Acid Violet 19 (0.67%) |
| Orange | Basic Orange 21 (1.5%) |
| Yellow | Basic Yellow 49 (1.0%) |
| Brown | Basic Yellow 49 (0.75%) |
|  | Basic Red 14 (0.75%) |
|  | Basic Violet 1 (0.125%) |
| Black | Basic Yellow 49 (1.0%) |
|  | Basic Blue 1 (0.25%) |
|  | Basic Red 14 (0.25%) |
|  | Basic Violet 1 (0.5%) |

The fluid in the reservoir 41 of the eradicating fluid dispenser 11, or in the eradicating stamp pad 51, contains a reducing agent which is the key ingredient for erasing marks produced by the coloring fluids. An example of a reducing agent suitable for the purposes of the present invention is sodium metabisulfite solution $Na_2S_2O_5$, which has a molecular weight of 190.11 and an absolute density of 1.48 grams per milliliter. $Na_2S_2O_5$ has an approximate pH of 4.3 in a 1% solution.

To recapitulate, the reservoir, say 31, of an appropriate one of the coloring fluid dispensers of an appropriate stamp pad, say 52, may comprise, for example, coloring fluid composed essentially of a unit of Solution A, together with a wetting agent (from 0.125 to 0.25% by weight of Solution A), an antioxidant (from 2 to 7% by weight of Solution A), and the appropriate dyestuff (from 0.125 to 3.25% by weight of the coloring fluid). The reservoir 41 of the eradicating fluid despenser 11 or stamp pad 51, may comprise, for example, an eradicating fluid consisting essentially of 65 to 95% by weight of Solution A, plus 5 to 35% by weight of a reducing agent. The preferable range of reducing agent is 10 to 15% by weight. Added to this mixture is a wetting agent (from 0.125 to 0.25% by weight of Solution A).

The coloring fluid which fills the reservoir, say 31, of the appropriate coloring fluid dispenser, or an appropriate stamp pad, say 52, may be, for example, prepared as follows: Solution A is heated at atmospheric conditions to approximately 30° to 60° Centigrade (about 85° to 140° Fahrenheit). While stirring, the remaining components are added to the heated solution: wetting agent, dyestuff, and antioxidant. For convenience in handling, the solution may be cooled, though this is optional. The solution is preferably strained through a filter cartridge of not greater than 5 micron porosity to eliminate undissolved and foreign matter to produce a clear colored solution. This procedure will prevent the coloring fluid from clogging the nib and therefore will maintain a continuous flow of coloring fluid from the dispenser, and also from the appropriate stamp pad.

The eradicating fluid which fills the reservoir 41, or is impregnated into stamp pad 51, is prepared in a manner similar to that of the coloring fluid. Solution A is heated at atmospheric conditions to approximately 30° to 60° Centigrade (about 85° to 140° Fahrenheit). While stirring, the remaining components are added to the heated solution: wetting agent and reducing agent. The solution may be optionally cooled for handling convenience. The solution is preferably strained through a filter cartridge of not greater than 5 micron porosity. As used in accordance with the present invention, two specific examples of a pink coloring fluid are:

EXAMPLE 1

|  | Weight (lb) | Weight (%) | Weight (lb) | Weight (%) |
|---|---|---|---|---|
| Water | 80. | 75.57 | 95. | 89.74 |
| Ethyleneglycol | 20. | 18.89 | 5. | 4.72 |
| "Triton X-100" | 0.250 | 0.24 | 0.250 | 0.24 |
| Citric Acid | 5. | 4.73 | 5. | 4.73 |
| Basic Red 14 | 0.606 | 0.57 | 0.606 | 0.57 |
|  | 105.856 | 100.00 | 105.856 | 100.00 |

A specific example, for present purposes, of the eradicating fluid is:

|  | Weight (lb) | Weight (%) |
|---|---|---|
| Water | 49.6 | 49.48 |
| Ethylene glycol | 12.4 | 12.37 |
| "Triton X-100" | 38.0 | 37.90 |
| $Na_2S_2O_5$ | .25 | .25 |
|  | 100.25 | 100.00 |

Particular advantages of the combinations of the present invention are that the colored marks produced by the coloring fluid dispensers 2-10 or the stamp 61-64 after application to one of the color stamp pads 52-55, are easily erased by the eradicating fluid dispenser 11. The colors do not become permanently set and are erasable at any point in time after they are made. The marks can be made on and erased from a variety of absorbent substrates, comprising, for example, paper, fabric, walls, human skin, furniture. Furthermore, a reverse or light imprint can be made on a colored background with one of stamps 61-64 which has been first applied to eradicator pad 51.

A particular feature of the invention is that the eradicating fluid dispenser will remove the mark 20 or a colored mark produced by one of stamps 61-64, in a manner which is substantially non-staining.

In accordance with a modification of the invention it is contemplated that a water soluble, non-oil-based scent may be added to either or both the coloring fluid or to the eradicating fluid.

Although several somewhat preferred and alternate embodiments of the invention have been disclosed and described in detail herein, it should be understood that this invention is in no sense limited thereby and its scope is to be determined by that of the appended claims. For example, a stamp pad is not limited to any specific number of colors, and may, or may not contain eradicator.

What is claimed is:

1. A coloring kit which comprises in combination:
   means comprising a plurality of devices capable of producing a series of rainbow-colored marks or imprints, including at least each of the primary colors red, yellow and blue, each of said devices including a reservoir of a different colored water-based fluid consisting essentially of a common carrier solution composed essentially of 70-100% deionized water and from 0-30% glycols; a non-ionic wetting agent in concentrations of from about 0.125 to 0.25% by weight of said carrier solution; an antioxidant in concentration of from about 0-7% by weight of said carrier solution, and predetermined dye-stuffs in concentrations from about 0.125 to 3.25% by weight of said carrier solution;
   marking or stamping means operable in collaboration with each said reservoir of colored water-based fluid to produce a discernible colored mark on a smooth substrate;
   means comprising a single eradicator fluid formulated to eradicate any and all of the colors of said rainbow-colored marks or imprints produced by said marking devices, said eradicator means comprising a reservoir of a water-based eradicator fluid consisting essentially of about 65-95% of said common carrier solution, about 5-35% reducing agent and about 0.125 to 0.25% wetting agent;
   marking or stamping means operable in collaboration with said reservoir of said eradicator to produce an imprint of eradicator fluid on said smooth substrate;
   wherein said eradicator fluid is so formulated that upon application to said discernible colored marks said eradicator will remove the color therefrom without removing the color from or substantially staining the substrate.

2. The combination in accordance with claim 1 wherein:
   said means for producing colored marks comprises a plurality of different color marker dispensers each including a corresponding one of said reservoirs and a nib communicating with said reservoir for producing one said discernible colored mark on said substrate; and
   said means for eradicating said colored marks comprises a dispenser of said eradicator fluid having a nib communicating with said reservoir for water-based eradicator fluid for producing a visible trace of eradicator fluid to neutralize each of said colored marks produced by said color marker dispensers.

3. A coloring kit in accordance with claim 2 comprising packaging means wherein said dispensers of different colored water-based fluid and said dispenser of water-based eradicator fluid are packaged together in said packaging means.

4. A coloring kit in accordance with claim 2 wherein each of said nibs consists essentially of polyester, and each of said multicolor fluid despensers contains a reservoir consisting substantially of a polyester fiber filler containing preferably between 0.1 and 1.2 cubic centimeters of an appropriate coloring fluid; and
   wherein said eradicating fluid despenser contains a nib consisting essentially of polyester, and a reservoir consisting substantially of a polyester fiber filler containing preferably about between 0.1 and 3.2 cubic centimeters of eradicating fluid.

5. The combination in accordance with claim 1 wherein said means for producing colored imprints comprise:
   a plurality of stamp pads each including a strip of absorbent material impregnated with a different colored water-based fluid, constituting a reservoir;
   an additional stamp pad comprising a strip of absorbent material impregnated with said water-based eradicating fluid, constituting a reservoir;
   at least one stamp formed of a smooth, resilient non-porous material having its bottom face sculpted with a raised design; and
   means for applying said stamp to any one of said stamp pads, including said stamp pad impregnated with eradicating fluid, and subsequently applying said stamp to said substrate to produce an imprint.

6. A coloring kit in accordance with claim 3 comprising packaging means including a container in which are mounted said stamp pads each impregnated with a different colored water-based fluid, and said stamp pad impregnated with said water-based eradicator fluid; and said packaging means including one or more of said stamps formed of smooth, resilient, non-porous material.

7. A coloring kit in accordance with claim 3 wherein all of said strips of the absorbent material are integrated into a single stamp pad having separated portions.

8. A coloring kit in accordance with claim 1 wherein:
   said means for producing colored marks comprises a plurality of different color marker dispensers each including a corresponding one of said reservoirs and a nib communicating with said reservoir for producing one said discernible colored mark on said substrate;
   said means to eradicate said colored marks comprises a dispenser of said eradicator fluid having a nib communicating with said reservoir of water-based eradicator fluid for producing a visible trace of eradicator fluid to neutralize each of said colored marks produced by said color marker dispensers;
   a plurality of stamp pads each including a strip of absorbent material impregnated with a different colored water-based fluid, constituting a reservoir;
   an additional stamp pad comprising a strip of absorbent material impregnated with said water-based eradicator fluid, constituting a reservoir;
   one or more stamps formed of a smooth, resilient non-porous material, having its bottom face sculpted with a raised design; and
   means for applying said stamp to any one of said stamp pads, including said stamp pad impregnated with eradicating fluid, and subsequently applying said stamp to said substrate to produce an imprint.

9. The coloring kit in accordance with claim 1 wherein said glycols are selected from the group consisting of:
   ethylene glycol, diethylene glycol, polypropylene glycol, triethylene glycol, and tetraethylene glycol.

10. The combination in accordance with claim 9 wherein said glycol consists essentially of ethylene glycol.

11. The coloring kit in accordance with claim 1 wherein said wetting agent consists essentially of an alkylaryl polyether alcohol manufactured by Rohm and Haas Company under the trademark "TRITON X-100".

12. A coloring kit in accordance with claim 1 wherein said reducing agent consists essentially of sodium metabisulfite solution $Na_2S_2O_5$ or an agent of comparable reducing potential.

13. A coloring kit in accordance with claim 12 wherein said reducing agent sodium metabisulfite solution $Na_2S_2O_5$ is combined in a ratio consisting essentially of 10 to 15% by weight of said $Na_2S_2O_5$ and 85 to 90% by weight of said solution A.

14. A coloring kit in accordance with claim 12 wherein said reducing agent consists essentially of a solution having a PH of about 4.3 in a one percent solution.

15. The combination in accordance with claim 1 wherein said antioxidant consists essentially of citric acid in a 2–7 weight percent of said carrier solution.

16. The combination in accordance with claim 1 wherein thhe blue colored fluid of said different colored water-based fluids comprises a dyestuff selected from the group consisting of Color Index Basic Blue 1 (Color Index #42025), Basic Blue 1A, Basic Blue 5 (Color Index #42140) and Basic Violet 3 (Color Index #42555).

17. The combination in accordance with claim 1 wherein the light blue colored fluid of said different colored water-based fluids comprises a dyestuff selected from the group consisting of Color Index Basic Blue 1 (Color Index #42025), Basic Blue 1A, Basic Blue 5 (Color Index #42140) and Basic Violet 3 (Color Index #42555).

18. The combination in accordance with claim 1 wherein the violet colored fluid of said different colored water-based fluids comprises a dyestuff selected from the group consisting of Basic Violet 1 (Color Index #42535), Basic Violet 3 (Color Index #42555), Acid Violet 17 (Color Index #42650), Acid Violet 19 (Color Index #42685), and Acid Violet 49 (Color Index #42640).

19. The combination in accordance with claim 1 wherein the green colored fluid of said different colored water-based fluids comprises a dyestuff selected from the group consisting of Acid Green 3 (Color Index #42085), Acid Green 9 (Color Index #42100), Basic Blue 1 (Color Index #42025), and Basic Yellow 49.

20. The combination in accordance with claim 1 wherein the light green colored fluid of said different colored water-based fluids comprises a dyestuff selected from the group consisting of Acid Green 3 (Color Index #42085), Acid Green 9 (Color Index #42100), Basic Blue 1 (Color Index #42025), and Basic Yellow 49.

21. The combination in accordance with claim 1 wherein the aqua colored fluid of said different colored water-based fluids comprises a dyestuff selected from the group consisting of Acid Green 3 (Color Index #42085), Acid Green 9 (Color Index #42100), Basic Blue 1 (Color Index #42025), and Basic Yellow 49.

22. The combination in accordance with claim 1 wherein the red colored fluid of said different colored water-based fluids comprises a dyestuff selected from the group consisting of Basic Red 14, and Basic Yellow 49.

23. The combination in accordance with claim 1 wherein the pink colored fluid of said different colored water-based fluids comprises a dyestuff selected from the group consisting of Basic Red 14 and Acid Violet 19 (Color Index #42685).

24. The combination in accordance with claim 1 wherein the magenta colored fluid of said different colored water-based fluids comprises a dyestuff selected from the group consisting of Basic Red 14 and Acid Violet 19 (Color Index #42685).

25. The combination in accordance with claim 1 wherein the orange colored fluid of said different colored water-based fluids comprises a dyestuff consisting essentially of Basic Orange 21 (Color Index #48035).

26. The combination in accordance with claim 1 wherein the yellow colored fluid of said different colored water-based fluids comprises a dyestuff consisting essentially of Basic Yellow 49.

27. The combination in accordance with claim 1 wherein the brown colored fluid of said different colored water-based fluids comprises a dyestuff selected from the group consisting of Basic Yellow 49, Basic Red 14, and Basic Violet 1 (Color Index #42535).

28. The combination in accordance with claim 1 wherein the black colored fluid of said different colored water-based fluids comprises a dyestuff selected from the group consisting of Basic Yellow 49, Basic Red 14, Basic Blue 1 (Color Index #42025), and Basic Violet 1 (Color Index #42535).

29. A coloring kit in accordance with claim 1 for producing colored imprints on a substrate wherein said reservoirs comprise a plurality of stamp pads each including a strip of absorbent material impregnated with a different colored fluid, and wherein said means comprising eradicator fluid comprises at least one stamp pad including eradicator fluid formulated to eradicate each of said different colored fluids;

comprising in combination at least one stamp formed of a smooth, resilient non-porous material having its bottom face sculpted with a raised design; and means for applying said stamp to any one of said stamp pads, and subsequently applying said stamp to said substrate to produce an imprint.

30. The combination in accordance with claim 1 wherein said rainbow colors include at least the colors red, orange, yellow, green, blue and violet.

31. The combination in accordance with claim 1 in which said marker and eradicator fluids are substantially non-toxic in the context of their use.

32. The method of providing a kit comprising a plurality of reservoirs of water-based coloring fluid for different color markings and a reservoir of eradicating fluid which operates to eradicate the colored marks of each of said coloring dispensers, which comprises the steps of:

mixing 70 to 100 weight percent water with 0 to 30 weight percent glycol to form a Solution A; combining said Solution A with a wetting agent in the amount of from 0.125 to 0.25 weight percent of Solution A thereby forming a common carrier solution; and for each of said coloring fluids:

dissolving a quantity of each of a plurality of appropriately colored dyestuffs in said common carrier solution to form a plurality of colored mixtures and adding a portion of antioxidant to each of said mixtures; and for said eradicating fluid:

dissolving a quantity of reducing agent in said Solution A in a ratio of from 5 to 35 parts of reducing agent for 95 to 65 parts of Solution A, and adding a wetting agent to said mixture in the amount of from 0.125 of 0.25 weight percent of Solution A.

33. The method in accordance with claim 25 whereby the mixture consisting essentially of Solution A, said wetting agent, said dyestuffs, and said antioxidant, is mixed and stirred over heat until reaching 30° to 60° Centigrade and, thereafter, said mixture is strained through a filter of not greater than 5 microns porosity to form said coloring fluid; and whereby the mixture consisting essentially of said Solution A, said wetting agent, and said reducing agent is mixed and stirred over heat until reaching 30° to 60° Centigrade and, thereafter, said mixture is strained through a filter of not greater than 5 microns porosity to form said eradicating fluid.

* * * * *